US008828473B2

(12) United States Patent
Barnekow et al.

(10) Patent No.: US 8,828,473 B2
(45) Date of Patent: Sep. 9, 2014

(54) SUBSTANCE MIXTURES

(71) Applicant: Symrise AG, Holzminden (DE)

(72) Inventors: Sylvia Barnekow, Marienmünster (DE); Kilian Schölling, Hagen (DE)

(73) Assignee: Symrise AG, Holzminden (DE)

( * ) Notice: Subject to any disclaimer, the term of this patent is extended or adjusted under 35 U.S.C. 154(b) by 0 days.

(21) Appl. No.: 13/845,708

(22) Filed: Mar. 18, 2013

(65) Prior Publication Data

US 2013/0243935 A1 Sep. 19, 2013

(30) Foreign Application Priority Data

Mar. 19, 2012 (EP) ..................................... 12160230

(51) Int. Cl.
*A23L 1/22* (2006.01)
*A23L 1/09* (2006.01)
*A23L 1/03* (2006.01)
*A23F 3/30* (2006.01)
*A23L 1/0522* (2006.01)
*A23L 1/226* (2006.01)

(52) U.S. Cl.
CPC ............. *A23L 1/22075* (2013.01); *A23L 1/095* (2013.01); *A23L 1/0315* (2013.01); *A23F 3/30* (2013.01); *A23L 1/0522* (2013.01); *A23L 1/22083* (2013.01); *A23L 1/22671* (2013.01)
USPC ........... 426/654; 426/661; 426/656; 426/518; 426/471

(58) Field of Classification Search
USPC ............................ 426/654, 661, 656, 518, 471
See application file for complete search history.

(56) References Cited

U.S. PATENT DOCUMENTS

| | | | | |
|---|---|---|---|---|
| 2006/0233917 | A1* | 10/2006 | Shobu et al. | 426/89 |
| 2008/0261897 | A1* | 10/2008 | Dorr et al. | 514/25 |
| 2010/0055197 | A1* | 3/2010 | Le-Henand et al. | 424/601 |
| 2012/0329936 | A1* | 12/2012 | Noami et al. | 524/459 |

FOREIGN PATENT DOCUMENTS

| | | |
|---|---|---|
| CA | 2516678 A1 | 2/2007 |
| CN | 101502656 A | 8/2009 |
| EP | 2008530 A1 | 12/2008 |
| EP | 2196099 A1 | 6/2010 |
| EP | 2201956 A1 | 6/2010 |
| EP | 2422629 A1 | 2/2012 |
| WO | 2007059953 A1 | 5/2007 |
| WO | 2008012089 A2 | 1/2008 |
| WO | 2008025560 A1 | 3/2008 |
| WO | 2008046857 A1 | 4/2008 |
| WO | 2011030351 A2 | 3/2011 |
| WO | 2011109764 A1 | 9/2011 |
| WO | 2011127039 A1 | 10/2011 |
| WO | 2011131990 A2 | 10/2011 |
| WO | 2011146443 A1 | 11/2011 |
| WO | 2012061242 A1 | 5/2012 |

OTHER PUBLICATIONS

Lookchem. No date provided. http://product.lookchem.com/item/867/Vitamin-E-Acetate-Supplier.html.*
Schmitt, Nature Reviews Clinical Oncology 8, 692 (Dec. 2011).*

* cited by examiner

*Primary Examiner* — Anthony Weier
(74) *Attorney, Agent, or Firm* — Dilworth & Barrese, LLP

(57) ABSTRACT

Suggested are substance mixtures, containing
(a) at least one starch derivative and
(b) at least one bitter principle and optionally
(c) stabilizers,
characterized in that components (a) and (b) are present in a weight ratio of from 1000:1 to 1:1.

7 Claims, No Drawings

SUBSTANCE MIXTURES

BACKGROUND OF THE INVENTION

1. Area of the Invention

The invention relates to the field of aroma substances and further relates to substance mixtures of starch derivatives and bitter principles, foods containing these substance mixtures, methods of their production, and use of the starch derivatives to mask undesired flavour profiles.

2. State of the Art

Good medicine is bitter to the mouth—this simple formula does not only confirm our life experience, but it is a fact that many natural active agents do have a positive effect on the human organism but they taste bitter and astringent. The group of polyphenols is a typical example thereof, specifically the proanthocyanidins and catechins, which are found in plants as different as litchis and green tea, but also in red clover. These groups of substances have been known for a long time for their blood-purifying and antihypertensive effects, and also the liquid-liquid extraction of the active agents does not present a particular preparative difficulty. Still, it has been hardly possible to add these substances to foods as additives, as their unpleasant taste cannot be masked, even by adding intense sweeteners.

The subject matter of International patent application WO 2006 085710 A1 (Amorepacific) discloses a process for the production of granulated green tea powder, to which small amounts of the most diverse substances are added as binders, among which are also catechins and maltodextrins. The publication does not mention an improvement in flavour.

International patent application WO 2008 059609 A1 (Kao) discloses a reduction of bitterness and astringency of non-polymerized catechins in beverages by adding sweeteners such as thaumatin, glycyrrhizine, sorbitol or erythritol.

From the International patent application WO 2011 141350 A1 (Unilever) it is known that the addition of water-soluble gum arabic or pectins reduces the bitterness and the astringency of catechins in beverages.

European patent application EP 1959754 A1 (Coca Cola) proposes a ternary mixture of sweeteners comprising inter alia carbohydrates and hydration products. Among many other suitable carbohydrates also maltodextrins are mentioned, and flavanols and flavanals are suitable hydration products, among others. However, combinations of both substance groups are not disclosed.

Furthermore, U.S. Pat. No. 8,003,150 (Kraft) discloses the production and use of flavonoids, which are added up with glucose, galactose or other reducing sugars. By adding sugars to the flavonoids, bitterness and astringency are reduced.

The subject matter of the Japanese patent application JP 2008 118873 A1 (Taiyo) is the improvement in flavour of beverages containing green tea extract by adding highly branched cyclic dextrins.

In addition, the Japanese patent application JP 08 298930 A1 describes a method in which a dextrin, a cyclodextrin and/or starch as well as the enzyme cyclo maltodextrin glucanotrans-ferase is added to a tea extract or a tea beverage. After the enzyme has taken effect a reduction of bitterness and astringency is perceptible.

Finally, solid tea preparations are known from Chinese patent application CN 101103753 A1 (Anhui Fuyang), containing also catechins and maltodextrin besides polyvinyl pyrrolidone and magnesium stearate. The preparations are characterized in that they are effective against high blood pressure. Any improvement in flavour is not reported.

Therefore, the object of the present invention was to provide substance mixtures comprising bitter principles, specifically polyphenols, and, particularly, catechins together with a food-grade masking agent such that the mixtures will have a neutral taste. It was a further object to provide sufficiently water-soluble substance mixtures allowing a simple incorporation into liquid compositions such as, for example, beverages and particularly instant tea beverages.

SUMMARY OF THE INVENTION

Subject matters of the invention are substance mixtures, comprising
(a) at least one starch derivative and
(b) at least one bitter principle and optionally
(c) stabilizers,
which are characterized in that components (a) and (b) are present in a weight ratio of from 1000:1 to 1:1.

Surprisingly it was found that the astringent and bitter flavour properties of bitter principles, specifically of catechins, were neutralized by adding of starch derivatives, particularly dextrins and, specifically, maltodextrins which were present in excess amount. The substance mixtures form complex compounds or inclusion compounds, which quite unexpectedly do not fall out but are water-soluble. Thus they can be used in a multitude of manners. By adding stabilizers such as ascorbates or benzoates the aqueous solutions can be additionally stabilized and viscosity can be adjusted as desired.

Description of the Preferred Embodiments

Starch Derivatives

Starch derivatives, which are suitable to form component a, are, preferably, selected from the group consisting of high-amylose starches, dextrins, maltodextrins and mixtures thereof. High-amylose starches are understood to be starches with an amylose content of at least 70% by weight such as, for example, wrinkled-pea starch (70% amylose) and amylomaize starch (>50% amylose). Dextrins is a collective term for various lower and higher polymers composed of D-glucose units corresponding to the general formula $(C_6H_{10}O_5)_n {}^* xH_2O$, which are formed during the incomplete hydrolysis of starch. Among the starch derivatives, the maltodextrins are particularly preferred, specifically non-cyclic compounds, which are obtained by enzymatic and/or thermic decomposition of starch, representing water-soluble or partly water-soluble carbohydrates. They consist of glucose units and have dextrose equivalents (DE) of below 20, preferably, of from 5 to 15.

Bitter Principles

A particular advantage of the present invention is that the starch derivatives, specifically the maltodextrins, are capable of masking a large number of very diverse bitter principles. Suitable bitter principles which may be used within the meaning of the present invention include the following groups:
  xanthines such as, for example, caffeine, theobromine or theophylline;
  phenolic glycosides such as, for example, chinine, salicine or arbutine;
  flavonoid glycosides such as, for example, neohesperidin, eriocitrin, neoeriocitrin, narirutin, hesperidin or naringin;
  chalcones, chalcone glycosides and dihydrochalcone glycosides such as, for example, phloridzin, trilobtain;
  hydrolysable tannins such as, for example, gallic acid esters or ellagic acid esters of carbohydrates and particularly pentagalloylglucose;

non-hydrolysable tannins such as, for example, galloyled catechins or epicatechins and the oligomers thereof, particularly proanthyocyanidins, procyanidins and thearubigenin;

flavones and the glycosides thereof such as, for example, quercetin, quercitrin, procyanidin B2, procyanidin B5, procyanidin C1, thearubigenin, rutin, taxifolin, myricetin and myrictrin;

caffeic acid and the esters thereof;

terpenoid bitter principles such as, for example, limonin, nomilin, lupolone and homolone;

pharmaceutical agents such as, for example, fluoroquinolone antibiotics, paracetamol, aspirin, β-lactam antibiotics, ambroxol, propylthiouracil [PROP], guaifenesin;

amino acids such as, for example, leucine, isoleucine, valine, tryptophan, proline, histidine, tyrosine, lysine or phenylalanine;

peptides, particularly such having an amino acid from the group leucine, isoleucine, valine, tryptophan, proline or phenylalanine at their N- or C-terminus; and metal salts such as, for example, potassium chloride, sodium sulfate, magnesium salts, iron salts, aluminium salts and zinc salts.

Suitable bitter principles are catechin, epicatechin, epigallocatechin gallate (EGCG), gallocatechin, gallocatechin-3-gallate, as the bitter and astringent taste of these substances is best masked by the starch derivatives, and here, especially, by maltodextrins.

Stabilizers

Stabilizers fulfil the function of keeping the water-soluble complexes of starch derivative and bitter principle soluble. This is particularly recommendable when the compositions need to be stored over a prolonged period of time at higher temperatures. The type and quantity of stabilizers also influences the viscosity of the compositions. Typical examples of suitable stabilizers are ascorbic acid, benzoic acid and the physiologically tolerable salts thereof such as, for example, sodium ascorbate or sodium benzoate. However, other salts of organic acids are also suitable on condition that their use as an additive to food products is approved. Examples are esters of citric acid, lactic acid or tartaric acid. Stabilizers are typically used in quantities of from about 0.5 to 2.5, preferably, from about 1 to 2.0 and, more preferably, of about 1% by weight based on the finished composition.

Preferred Substance Mixtures

As already explained above, the combination of maltodextrins and catechins is a preferred form of embodiment of the invention, as it most clearly provides the effect of masking the flavour. Therefore, those substance mixtures are preferred in which maltodextrins are the starch derivatives, and the bitter principles are selected from the group consisting of catechin, epicatechin, epigallocatechin gallate (EGCG), gallocatechin, gallocatechin-3-gallate and the mixtures thereof.

Naturally, there is a lower limit where the starch derivatives are not capable of masking the flavour profile of the bitter principles anymore. This happens when the bitter principles are quantitatively predominant. Preferably, components (a) and (b) are present in a weight ratio of from about 500:1 to 15:1 and, more preferably, of from about 200:1 to 30:1.

In another preferred embodiment of the invention the compositions have a water content of less than 2% by weight. This is achieved by evaporating the substance mixtures to dryness, which are present as aqueous solutions for production reasons, for example, by separating the water by means of rotary evaporation, lyophilisation or, preferably, spray-drying. In doing so, substance mixtures which are water-free and present as powders or granulates, are particularly preferable.

Process of Manufacture

The substance mixtures according to the invention can be obtained according to different, but very similar, processes:

In a first embodiment, the bitter principle is dissolved in water. Then the starch derivative is added and the mixture is intensely stirred; optionally, viscosity is adjusted to a value of, for example, of from about 10 to 2.000 mPas (Brookfield RVT, 20° C., spindle 3) by adding the stabilizer. An alternative process is that the bitter principle and the stabilizer are dissolved in water, the starch derivative is added, and the mixture is vigorously stirred. It is also possible to mix and mill the bitter principle, the starch derivative and the stabilizer in water-free form, then to dissolve the powder in water and to vigorously stir the mixture.

Optionally, the aqueous solutions thus obtained may, again, be evaporated and to be adjusted to a residual water content of a maximum of 2% by weight water. The preferred form of evaporation of the solutions is by spray-drying. In doing so, powders or granulates are obtained—depending on the process—which are usually even completely water-free.

Industrial Application

The substance mixtures available within the meaning of the invention may be added to foods. A further subject matter of the invention therefore relates to such foods which comprise the substance mixtures according to the invention in quantities of, for example, from 1 to 10 and, preferably, from 2 to 5% by weight. Typical examples are beverages, particularly lemonades and tea beverages, soy products, milk products, tea beverages, particularly yoghurts, bakery products, juices, chocolate and chewing gums and bonbons. A last aspect of the invention consists in the use of starch derivatives, specifically maltodextrins, to mask the bitter and astringent flavour of bitter principles, particularly of catechins.

Capsules

The compositions of starch derivatives, bitter principles and optionally stabilizers according to the invention themselves but also confectionated food compositions including them may also be present in encapsulated form. Besides the usual macrocapsules on the basis of gelatine, also the so-called micro- or nanocapsules are particularly suitable. These are understood by the expert to be spherical aggregates with a diameter of about 0.0001 to about 5 mm and, preferably, of about 0.005 to about 0.5 mm, which contain at least one solid or liquid core surrounded by at least one continuous membrane. More precisely, they are finely dispersed liquid or solid phases coated with film-forming polymers, in the production of which the polymers are deposited onto the material to be encapsulated after emulsification and coacervation or interfacial polymerization. In another process, molten waxes are absorbed in a matrix ("microsponge") which, as microparticles, may be additionally coated with film-forming polymers. In a third process, particles are alternatingly coated with polyelectrolytes of different charges ("layer-by-layer" process). The microscopically small capsules can be dried in the same way as powders. Besides single-core microcapsules, there are also multiple-core aggregates, also known as microspheres, which contain two or more cores distributed in the continuous membrane material. In addition, single-core or multiple-core microcapsules may be surrounded by an additional second, third etc. membrane. The membrane may consist of natural, semisynthetic or synthetic materials. Natural membrane materials are, for example, gum arabic, agar agar, agarose, again, maltodextrins, alginic acid and salts thereof, for example sodium or calcium alginate, fats and fatty acids, cetyl alcohol, collagen, chitosan, lecithins, gelatin, albumin, shellac, polysaccharides, such as starch or dextran, polypeptides, protein hydrolyzates, sucrose and waxes. Semisynthetic membrane materials are inter alia chemically modified celluloses, more particularly cellulose esters and ethers, for example cellulose acetate, ethyl cellulose, hydroxypropyl cellulose, hydroxypropyl methyl cellulose and carboxymethyl cellulose, and starch derivatives, more particularly starch ethers and esters. Synthetic membrane materials are, for example, polymers, such as polyacrylates, polyamides, polyvinyl alcohol or polyvinyl pyrrolidone. Examples of known microcapsules are the following commercial products (the membrane material is shown in brackets) Hallcrest Microcapsules (gelatin, gum arabic), Coletica Thalaspheres (maritime collagen), Lipotec Millicapseln (alginic acid, agar agar), Induchem Unispheres (lactose, microcrystalline cellulose, hydroxypropylmethyl cellulose), Unicerin C30 (lactose, microcrystalline cellulose, hydroxypropylmethyl cellulose), Kobo Glycospheres (modified starch, fatty acid esters, phospholipids), Softspheres (modified agar agar), Kuhs Probiol Nanospheres (phospholipids), Primaspheres and Primasponges (chitosan, alginates) and Primasys (phospholipids). Particularly interesting for the encapsulation of compositions for cosmetic applications are coacervates of cationic polymers, particularly of chitosan, with anionic polymers, specifically alginates. Chitosan microcapsules and processes for their production are the subject of International Patent Applications WO 2001 001926 A1, WO 2001 001927 A1, WO 2001 001928 A1 and WO 2001 001929 A1 (Cognis).

Gel Formers

Microcapsules often contain active agents which are dissolved or dispersed in a gel phase. Preferred gel formers are substances which are capable of forming gels in aqueous solution at temperatures above 40° C. Typical examples of such gel formers are heteropolysaccharides and proteins. Preferred thermogelling heteropolysaccharides are agaroses which may be present in the form of the agar agar obtainable from red algae, even together with up to 30% by weight of non-gel-forming agaropectins. The principal principle of agaroses are linear polysaccharides of D-galactose and 3,6-anhydro-L-galactose with alternate β-1,3- and β-1,4-glycosidic bonds. The heteropolysaccharides preferably have a molecular weight of 110,000 to 160,000 and are both odorless and tasteless. Suitable alternatives are pectins, xanthans (including xanthan gum) and mixtures thereof. Other preferred types are those which—in 1% by weight aqueous solution—still form gels that do not melt below 80° C. and solidify again above 40° C. Examples from the group of thermogelling proteins are the various gelatins.

Cationic Polymers

Suitable cationic polymers are, for example, cationic cellulose derivatives such as, for example, the quaternized hydroxyethyl cellulose obtainable from Amerchol under the name of Polymer JR 400®, cationic starch, copolymers of diallyl ammonium salts and acrylamides, quaternized vinyl pyrrolidone/vinyl imidazole polymers such as, for example, Luviquat® (BASF), condensation products of polyglycols and amines, quaternized collagen polypeptides such as, for example, Lauryldimonium Hydroxypropyl Hydrolyzed Collagen (Lamequat® L, Grünau), quaternized wheat polypeptides, polyethyleneimine, cationic silicone polymers such as, for example, amodimethicone, copolymers of adipic acid and dimethylaminohydroxypropyl diethylenetriamine (Cartaretine®, Sandoz), copolymers of acrylic acid with dimethyl diallyl ammonium chloride (Merquat® 550, Chemviron), polyaminopolyamides and crosslinked water-soluble polymers thereof, cationic chitin derivatives such as, for example, quaternized chitosan, optionally in microcrystalline distribution, condensation products of dihaloalkyls, for example dibromobutane, with bisdial-kylamines, for example, bis-dimethylamino-1,3-propane, cationic guar gum such as, for exampie, Jaguar®CBS, Jaguar® C-17, Jaguar® C-16 of Celanese, quaternized ammonium salt polymers such as, for example, Mirapol® A-15, Mirapol® AD-1, Mirapol® AZ-1 of Miranol. Preferably, chitosan is used as encapsulation material. Chitosans are biopolymers which belong to the group of hydrocolloids. Chemically, they are partly deacetylated chitins varying in molecular weight which contain the idealized monomer unit:

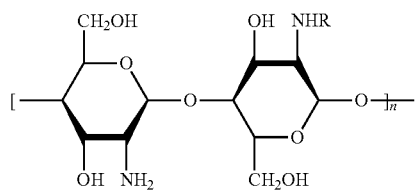

In contrast to most hydrocolloids, which are negatively charged at biological pH values, chitosans are cationic biopolymers under these conditions. The positively charged chitosans are capable of interacting with positively charged surfaces and are therefore used in cosmetic haircare and body-care products and pharmaceutical preparations. Chitosans are produced from chitin, preferably from the shell remains of crustaceans which are available in large quantities as inexpensive raw materials. Normally, the chitin is first deproteinized by addition of bases, demineralized by addition of mineral acids and, finally, deacetylated by addition of strong bases in a process described for the first time by Hackmann et al., the molecular weights being spread over a broad range. Preferred types are those which have an average molecular weight of 10,000 to 500,000 dalton or 800,000 to 1,200,000 dalton and/or a Brookfield viscosity (1% by weight in glycolic acid) below 5,000 mPas, a degree of deacetylation of 80 to 88% and an ash content of less than 0.3% by weight. In the interests of better solubility in water, the chitosans are generally used in the form of their salts, preferably as glycolates.

Anionic Polymers

The function of the anionic polymers is to form membranes with the chitosans. For this purpose salts of alginic acids are preferably used. The alginic acid is a mixture of carboxyl-containing polysaccharides with the following idealized monomer unit:

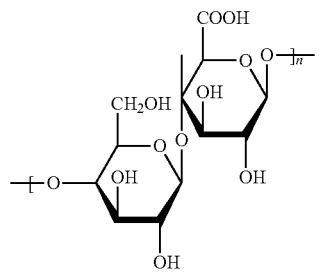

The average molecular weight of the alginic acid or the alginates is in the range from 150,000 to 250,000. Salts of alginic acid and complete and partial neutralization products thereof are understood in particular to be the alkali metal salts, preferably sodium alginate ("algin") and the ammonium and alkaline earth metal salts. Mixed alginates, for example, sodium/magnesium or sodium/calcum alginates, are particularly preferred. In an alternative embodiment of the invention, however, anionic chitosan derivatives, for example, carboxylation and above all succinylation products, are also suitable for this purpose. Alternatively, poly(meth) acrylates with average molecular weights of 5,000 to 50,000 dalton and the various carboxymethyl celluloses may also be used. Instead of the anionic polymers, anionic surfactants or low molecular weight inorganic salts, such as, pyrophosphates, for example, may also be used for forming the membrane.

Encapsulation

To produce the microcapsules, a 1 to 10 and preferably, 2 to 5% by weight aqueous solution of the gel former, preferably agar-agar, is normally prepared and heated under reflux. A second aqueous solution containing the cationic polymer, preferably chitosan in quantities of 0.1 to 2 and preferably 0.25 to 0.5% by weight and the active principles in quantities of 0.1 to 25 and preferably 0.25 to 10% by weight is added in the boiling heat, preferably at 80 to 100° C.; this mixture is called the matrix. Accordingly, the charging of the microcapsules with active substances may also comprise 0.1 to 25% by weight, based on the weight of the capsules. If desired, water-insoluble principles, for example, inorganic pigments, may be added at this stage to adjust viscosity, generally in the form of aqueous or aqueous/alcoholic dispersions. In addition, to emulsify or disperse the active substances, it can be useful to add emulsifiers and/or solubilisers to the matrix. After its preparation from gel former, cationic polymer and active principles, the matrix may optionally be very finely dispersed in an oil phase with intensive shearing in order to produce small particles in the subsequent encapsulation process. It has proved to be particularly advantageous in this regard to heat the matrix to temperatures in the range from 40 to 60° C. while the oil phase is cooled to 10 to 20° C. The actual encapsulation, i.e. formation of the membrane by contacting the cationic polymer in the matrix with the anionic polymers, takes place in the last, again compulsory step. To this end, it is advisable to treat the matrix optionally dispersed in the oil phase with an aqueous ca. 1 to 50 and preferably 10 to 15% by weight aqueous solution of the anionic polymer at a temperature of 40 to 100° C. and preferably at a temperature of 50 to 600 and, if necessary, to remove the oil phase either at the same time or afterwards. The resulting aqueous preparations generally have a microcapsule content of 1 to 10% by weight. In some cases, it can be of advantage for the solution of the polymers to contain other ingredients, for example, emulsifiers or preservatives. After filtration, microcapsules with a mean diameter of preferably about 0.01 to 1 mm are obtained. It is advisable to sieve the capsules to ensure a uniform size distribution. The microcapsules thus obtained may have any shape within production-related limits, but are preferably substantially spherical. Alternatively, the anionic polymers may also be used for the preparation of the matrix and encapsulation may be carried out with the cationic polymers.

In an alternative process, encapsulation can also be performed by exclusively using cationic polymers, in the process of which their feature is exploited that they coagulate at pH values above the pKs value.

In another alternative process for the production of the microcapsules according to the invention, an o/w emulsion containing an effective quantity of emulsifier besides the oil component, water and the active principles is first prepared. To produce the matrix, a suitable quantity of an aqueous anionic polymer solution is added to this preparation with vigorous stirring. The membrane is formed by adding the chitosan solution. The entire process preferably takes place in the mildly acidic range at pH 3 to 4. If necessary, the pH is adjusted by adding mineral acid. After formation of the membrane, the pH is raised to 5 to 6, for example, by adding triethanolamine or another base. This results in an increase in viscosity which can be supported by adding other thickeners such as, for example, polysaccharides, more particularly xanthan gum, guar-guar, agar-agar, alginates and tyloses, carboxymethyl cellulose and hydroxyethyl and hydroxypropyl cellulose, also relatively high molecular weight polyethylene glycol mono- and diesters of fatty acids, polyacrylates and polyacrylamides. Finally, the microcapsules are removed from the aqueous phase by, for example decantation, filtration or centrifuging.

In a third alternative procedure, microcapsules are formed around a preferably solid, for example, crystalline, core, by coating it with oppositely charged polyelectrolytes in layers. In this context it is referred to European Patent EP 1064088 B1 (Max-Planck Gesellschaft).

EXAMPLES

Manufacturing Example H1

In a 250 ml beaker, 60 g maltodextrin DE10 were dissolved in ca. 38 ml of water at 50° C. under vigorous stirring. 0.75 g epigallocatechin gallate (EGCG) were added, and the mixture was stirred for another 30 min until a clear solution was obtained, to which 0.5 g of ascorbic acid and sodium benzoate each were added.

Manufacturing Example H2

In a 250 ml beaker, 0.5 g ascorbic acid, 0.5 g sodium benzoate and 0.5 g epigallocatechin gallate were placed and dissolved in ca. 49 ml of water at 50° C. under vigorous stirring. Subsequently, 100 g of maltodextrin DE10 was added and stirred for another 15 min until a clear solution was obtained.

Application Examples 1 Bis 3, Comparison Example V1

Sampling was carried out using a product produced analogously to example H2. However, maltodextrins from various origins were used. The intensity of bitterness and astringency was determined by a panel consisting of 5 people and evaluated on a scale of from 0 (no impression) to 10 (very strong impression). The results in Table 1 represent the mean values of 5 series of measurements. Examples 1 to 3 are according to the invention and example V1 serves control purposes.

TABLE 1

Impression of bitterness and astringency

| Expl. | Maltodextrin | | Epigallo-catechin gallate | Bitterness | Astringency |
|---|---|---|---|---|---|
| V1 | Without maltodextrin | | 750 ppm | 10 | 9 |
| 1 | Maltodextrin of waxy maize starch | 50.000 ppm 100.000 ppm | 750 ppm 750 ppm | 5 2 | 4 1 |
| 2 | Maltodextrin of potato starch | 50.000 ppm 100.000 ppm | 750 ppm 750 ppm | 4 1 | 5 2 |
| 3 | Maltodextrin of tapioka starch | 50.000 ppm 100.000 ppm | 750 ppm 750 ppm | 5 2 | 6 2 |

Examples of Use 4 to 6, Comparison Example V2

Sampling was carried out using a product produced analogously to example H2. However, dextrins of various origins were used. The intensity of bitterness and astringency was determined by an untrained panel consisting of 5 people and evaluated on a scale of from 0 (no impression) to 10 (very strong impression). The results in Table 2 are the mean values of 5 series of measurements. Examples 4 to 6 are according to the invention, example V2 serves control purposes.

TABLE 2

| | Impression of bitterness and astringency | | | |
|---|---|---|---|---|
| Expl. | Maltodextrin | | Caffeine | Bitterness | Astringency |
| V2 | Without maltodextrin | | 750 ppm | 8 | 7 |
| 4 | Dextrin of waxy maize starch | 50.000 ppm 100.000 ppm | 750 ppm 750 ppm | 7 6.5 | 6 6 |
| 5 | Dextrin of potato starch | 50.000 ppm 100.000 ppm | 750 ppm 750 ppm | 7 6.5 | .5 6.5 |
| 6 | Dextrin of tapioka starch | 50.000 ppm 100.000 ppm | 750 ppm 750 ppm | 7.5 7 | 6.5 6 |

Example 7

Production of an Instant Tea Beverage 0.75 g epigallocatechin gallate were completely dissolved in 1000 ml of an instant tea beverage under vigorous stirring. Subsequently, 100 g of maltodextrin DE10 were added and the mixture was vigorously stirred for another 15 min.

The invention claimed is:

1. A substance mixture, comprising
   (a) at least one starch derivative selected from the group consisting of high-amylose starches, dextrins, maltodextrins and mixtures thereof, and
   (b) at least one bitter principle, and optionally
   (c) stabilizers,
   wherein the components (a) and (b) are present in the weight ratio of entire amount of starch derivative (a) to entire amount of bitter principle (b) from about 1000:1 to about 200:1 to mask and neutralize astringent and bitter flavour ;properties of the entire amount of bitter principle (b) and form complex or inclusion compounds which do not fall out and are water-soluble.

2. The substance mixture of Claim 1, wherein the bitter principles (component b) are selected from the group consisting of xanthines, phenolic glycosides, flavonoid glycosides, chalcones, chalcone glycosides, dihydrochalcone glycosides, hydrolysable or non-hydrolysable tannins, flavones, flavone glycosides, caffeic acid, caffeic acid esters, terpenoid bitter principles, pharmaceutical active agents, amino acids, peptides, metal salts and the mixtures thereof.

3. The substance mixture of claim 1, wherein the stabilizers are selected from the group consisting of ascorbic acid, benzoic acids and the physiologically tolerable salts thereof.

4. The substance mixture of claim 1, wherein the starch derivatives are maltodextrins and the bitter principles are selected from the group consisting of catechin, epicatechin, epigallocatechin gallate (EGCG), gallocatechin, gallocatechin-3-gallate and the mixtures thereof.

5. The substance mixture of claim 1, wherein they have a water content of a maximum of 2% by weight.

6. A food composition comprising the substance mixtures of claim 1.

7. The substance mixture of claim 1, wherein the components (a) and (b) are present in the weight ratio of from about 1000:1 to about 500:1.

* * * * *